United States Patent
Li et al.

(10) Patent No.: US 9,551,833 B1
(45) Date of Patent: Jan. 24, 2017

(54) ULTRA COMPACT FREE-SPACE MULTIPLEXER/DEMULTIPLEXER

(71) Applicant: Alliance Fiber Optic Products, Inc., Sunnyvale, CA (US)

(72) Inventors: Yao Li, Newark, CA (US); Fenfei Liu, Fremont, CA (US); Xiaotao Peng, Fremont, CA (US); Andy Fenglei Zhou, Fremont, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 14 days.

(21) Appl. No.: 14/545,271

(22) Filed: Apr. 15, 2015

Related U.S. Application Data

(60) Provisional application No. 61/995,692, filed on Apr. 18, 2014.

(51) Int. Cl.
| | |
|---|---|
| *G02B 6/293* | (2006.01) |
| *H04J 14/02* | (2006.01) |
| *G02B 6/36* | (2006.01) |

(52) U.S. Cl.
CPC .......... *G02B 6/29365* (2013.01); *H04J 14/02* (2013.01); *G02B 6/3628* (2013.01)

(58) Field of Classification Search
None
See application file for complete search history.

(56) References Cited

U.S. PATENT DOCUMENTS

| | | | |
|---|---|---|---|
| 5,583,683 A | 12/1996 | Scobey | |
| 6,301,407 B1 * | 10/2001 | Donaldson | G02B 6/29365 385/16 |
| 7,630,599 B2 | 12/2009 | McLaughlin et al. | |
| 8,538,210 B2 | 9/2013 | Wang et al. | |
| 8,761,554 B2 | 6/2014 | Matsumoto et al. | |
| 2003/0099434 A1* | 5/2003 | Liu | G02B 6/29367 385/31 |
| 2006/0177177 A1* | 8/2006 | Jenkins | G02B 6/12007 385/33 |
| 2006/0198576 A1* | 9/2006 | Furusawa | G02B 6/29367 385/24 |
| 2009/0016716 A1 | 1/2009 | Ishida | |
| 2012/0237222 A9* | 9/2012 | Wang | G02B 6/29367 398/79 |

* cited by examiner

*Primary Examiner* — Mike Stahl
(74) *Attorney, Agent, or Firm* — Dinsmore & Shohl LLP

(57) ABSTRACT

An apparatus for multiplexing and demultiplexing comprises: a substrate having a first surface and a second surface, where the second surface is opposite to the first surface; a first fiber array unit disposed on the first surface of the substrate and a second fiber array unit disposed on the second surface of the substrate, where a plurality of fibers in a fiber array unit are arranged in an array on a chip; a first microlens array disposed on the first surface of the substrate and a second microlens array disposed on the second surface of the substrate; a plurality of thin film filters disposed on the first and second surface of the substrate, where each thin film filter transmits light having a different wavelength band; a fiber collimator disposed on the first surface of the substrate; a turning prism disposed at an edge of the substrate for turning light from the first surface to the second surface of the substrate or also turning light from the second surface to the first surface of the substrate.

17 Claims, 11 Drawing Sheets

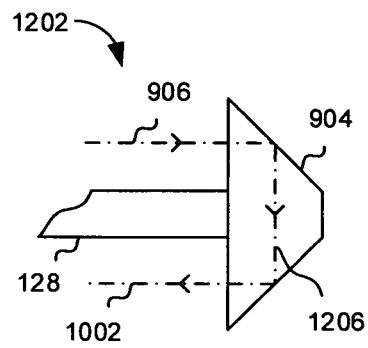
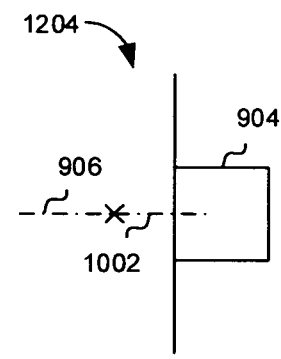
FIG. 12A  FIG. 12B
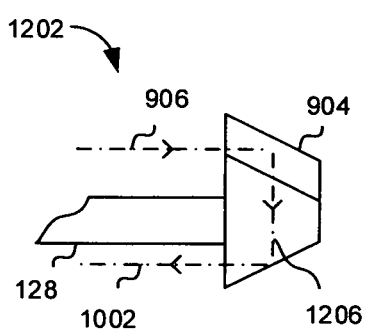
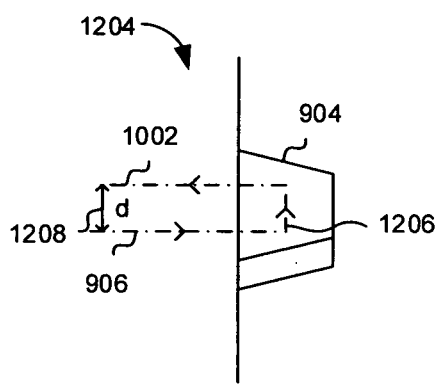
FIG. 12C  FIG. 12D

ULTRA COMPACT FREE-SPACE MULTIPLEXER/DEMULTIPLEXER

CROSS-REFERENCE TO RELATED APPLICATIONS

This application claims the benefit to U.S. Provisional Application No. 61/995,692, filed Apr. 18, 2014.

FIELD OF THE INVENTION

This invention relates to free-space multiplexer and demultiplexer, and more specifically relates to ultra compact free-space multiplexer and demultiplexer comprising fiber array unit (FAU) and microlens array (MLA).

BACKGROUND OF THE INVENTION

Wavelength division multiplexing (WDM) technology may multiplex more than one carrier signals in a single optical fiber. Each carrier signal has different wavelength. Carrier signals may be combined by a multiplexer (Mux). The combined carrier signals may travel in a fiber. The combined carrier signals form a multiplexed signal. After leaving the fiber, the combined carrier signals may be separated into the original carrier signals by a demultiplexer (Demux).

Mux and Demux may be constructed using various approaches, for example, Bragg grating approach, fused fiber coupler approach, and the like. An approach is based on a set of thin film filters (TFFs). A first TFF may transmit a first wavelength, e.g., $\lambda 1$, and reflect all other wavelengths, e.g., $\lambda 2$, $\lambda 3$, and $\lambda 4$. Thus, a first carrier signal having wavelength $\lambda 1$ may be selected. A second TFF may transmit a second wavelength, e.g., $\lambda 2$, and reflect the remaining wavelengths, e.g., $\lambda 3$, and $\lambda 4$. Thus, a second carrier signal having wavelength $\lambda 2$ may be selected. A third TFF may transmit a third wavelength, e.g., $\lambda 3$, and reflect the remaining wavelength, e.g., $\lambda 4$. Thus, a third carrier signal having wavelength $\lambda 3$ may be selected. Finally, the last carrier signal having wavelength $\lambda 4$ remains and thus it may be selected as well.

A free-space WDM Demux using TFFs is disclosed in U.S. Pat. No. 5,583,683 to Scobey. Scobey teaches that the multiplexed carrier signals containing wavelength $\lambda 1$-$\lambda 8$ exit from a common fiber coupled with a fiber collimator. The multiplexed carrier signals are collimated by the fiber collimator and propagate in free space until impinge on a first TFF. The first TFF transmits the first carrier signal having wavelength $\lambda 1$ and reflects the remaining carrier signals having wavelengths $\lambda 2$-$\lambda 8$. The transmitted collimated carrier signal having wavelength $\lambda 1$ is coupled to a fiber channel 1 by a fiber collimator.

The reflected remaining carrier signals impinge on a second TFF. The second TFF transmits the second carrier signal having wavelength $\lambda 2$ and reflects the remaining carrier signals having wavelengths $\lambda 3$-$\lambda 8$. The transmitted collimated carrier signal having wavelength $\lambda 2$ is coupled to a fiber channel 2 by a fiber collimator. The process is repeated until the last TFF transmits the carrier signal having wavelength $\lambda 8$. The device can also function as a Mux when the light path is reversed.

A compact free-space WDM Mux/Demux using TFFs is disclosed in U.S. Pat. No. 8,538,210 to Wang et al. Wang et al. teaches that the fibers and their corresponding fiber collimators are disposed on two opposite sides' of a substrate. Both Scobey and Wang et al. use fiber collimators. A fiber collimator typically has a diameter larger than 1 mm. Thus the sizes of Muxs/Demuxs of Scobey and Wang et al. may not be reduced, since the sizes are limited by the size of fiber collimators used. Accordingly, new approaches to further reduce the size of free-space WDM Mux/Demux are required.

BRIEF DESCRIPTION OF THE DRAWINGS

Non-limiting and non-exhaustive embodiments of the present invention are described with reference to the following figures, wherein like reference numerals refer to like parts throughout the various views and embodiments unless otherwise specified.

FIG. 12A shows a cross-section perpendicular to a turning prism for $\alpha=0$.

FIG. 12B shows a cross-section parallel to a first surface and a second surface of a substrate for $\alpha=0$.

FIG. 12C shows a cross-section similar to FIG. 12A for $\alpha\neq 0$.

FIG. 12D shows a cross-section similar to FIG. 12B for $\alpha\neq 0$.

Figure 1:
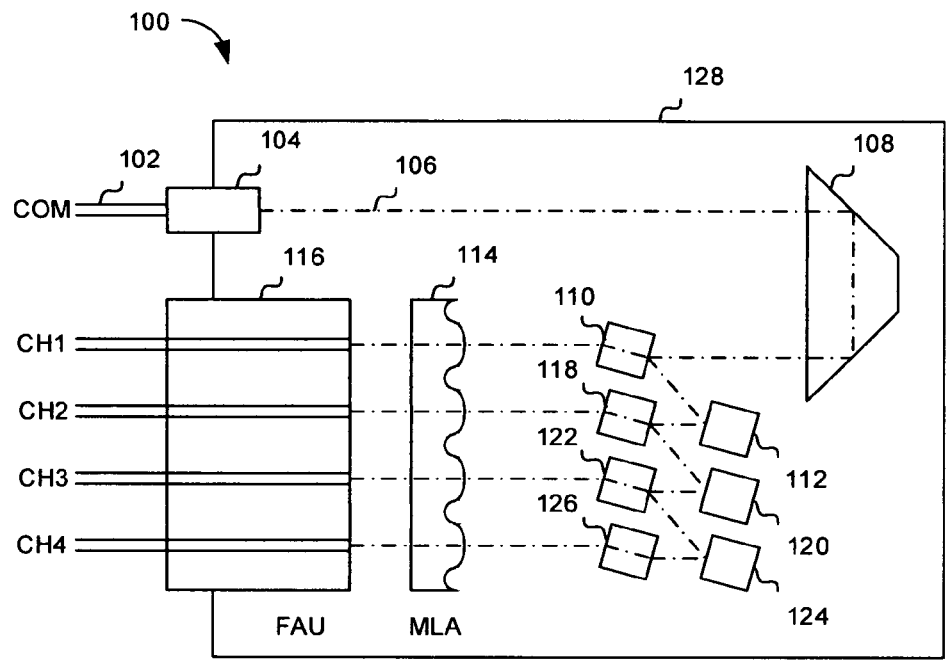
FIG. 1 shows a Mux/Demux comprising a fiber collimator, a fiber array unit (FAU), and a microlens array (MLA).

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exag-

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

FIG. 1 shows an ultra compact free-space Mux/Demux 100 using a fiber collimator 104, a fiber array unit (FAU) 116, and a microlens array (MLA) 114, according to an embodiment of the invention. When Mux/Demux 100 operates as a Demux, an input fiber 102 coupled with fiber collimator 104 form a common (COM) port. For example, the multiplexed signal has four wavelength bands $\lambda 1$-$\lambda 4$. For simplicity, wavelength bands are also referred to as wavelengths. Light 106 exiting from fiber collimator 104 is reflected twice by a prism 108 and is directed toward a first TFF 110 in free space. First TFF 110 transmits light having wavelength $\lambda 1$ and reflects the remaining light having other wavelengths toward a mirror 112. Light transmitted by first TFF 110 is focused by a first microlens of MLA 114 onto a first fiber of FAU 116. The first fiber of FAU 116 forms channel 1 (CH1) port.

Light reflected by first TFF 110 toward mirror 112 is further reflected by mirror 112 toward a second TFF 118. Second TFF 118 transmits light having wavelength $\lambda 2$ and reflects the remaining light having other wavelengths toward a mirror 120. Light transmitted by second TFF 118 is focused by a second microlens of MLA 114 onto a second fiber of FAU 116. The second fiber of FAU 116 forms channel 2 (CH2) port.

Light reflected by second TFF 118 toward mirror 120 is further reflected by mirror 120 toward a third TFF 122. Third TFF 122 transmits light having wavelength $\lambda 3$ and reflects the remaining light having other wavelengths toward a mirror 124. Light transmitted by third TFF 122 is focused by a third microlens of MLA 114 onto a third fiber of FAU 116. The third fiber of FAU 116 forms channel 3 (CH3) port.

Light reflected by third TFF 122 toward mirror 124 is further reflected by mirror 124 toward an optional fourth TFF 126. Optionally, fourth TFF 126 transmits the remaining light having wavelength $\lambda 4$. Light transmitted by optional fourth TFF 126 is focused by a fourth microlens of MLA 114 onto a fourth fiber of FAU 116. The fourth fiber of FAU 116 forms channel 4 (CH4) port. All elements of Mux/Demux 100 may be disposed on a substrate 128.

A FAU comprises at least one fiber. The fibers are arranged in an array on a chip. The chip may be V-grooved with a pitch 127 $\lambda$m or 250 $\lambda$m. The fibers may be disposed in the V-grooves. The chip may be made from glass, quartz, silicon, pyrex, polymeric materials, and the like. For example, a FAU may be available from AFOP, Fremont, Calif., the assignee of the present invention (www.afop.com).

A MLA may comprise 2D array or 1D array of microlenses. The lens pitch in the array may be 250 µm, which is the same as the fiber pitch of FAU. The MLA may be made from glass, quartz, silicon, pyrex, polymeric materials, and the like. For example, a MLA may be available from SUSS MicroOptics, Neuchatel, Switzerland (www.suss-microoptics.com). The fiber pitch and the microlens pitch, which are only 250 µm, make the ultra compact free-space Mux/Demux possible.

Figures 2A, 2B:
FIG. 2A shows a pair of mirrors replacing the prism in FIG. 1.
FIG. 2B shows a pair of prisms replacing the prism in FIG. 1.

Prism 108 in FIG. 1 may be replaced by a pair of mirrors 204 as shown in FIG. 2A, according to an embodiment of the invention, or a pair of prisms 206 as shown in FIG. 2B, according to an embodiment of the invention.

Figure 3:
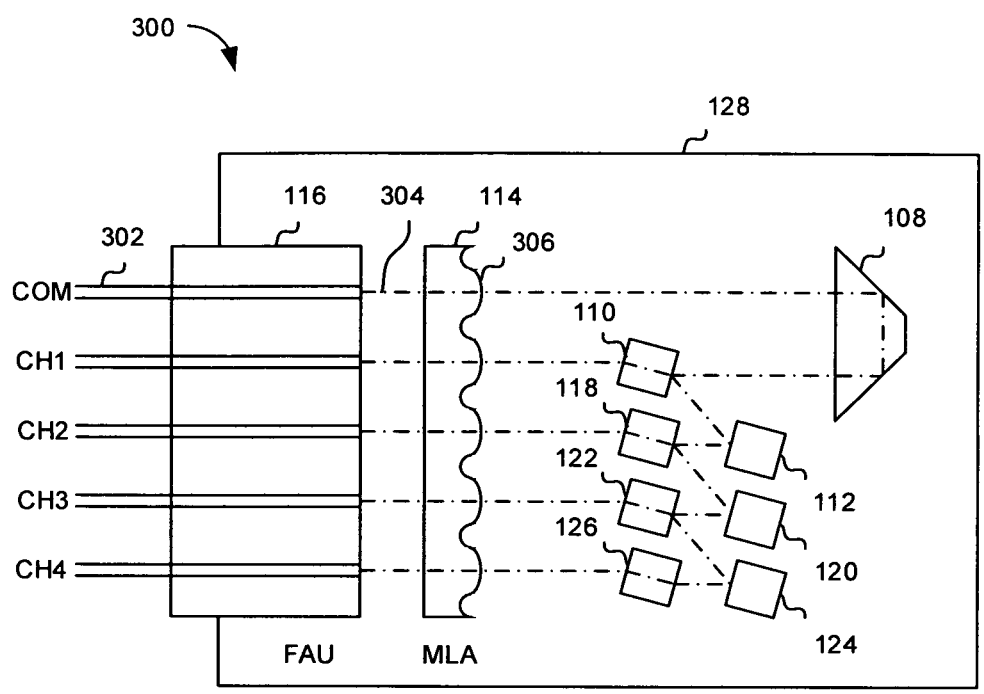
FIG. 3 shows a Mux/Demux comprising a FAU and a MLA without a fiber collimator.

FIG. 3 shows an ultra compact free-space Mux/Demux 300 using a FAU and a MLA without a fiber collimator, according to an embodiment of the invention. FIG. 3 is similar to FIG. 1. For brevity, detailed descriptions of identical portions are omitted.

When Mux/Demux 300 operates as a Demux, a first fiber 302 of a FAU 116 forms a common (COM) port. Light 304 exiting from first fiber 302 is collimated by a first microlens 306 of a MLA 114 and directed to a prism 108 in free space. The collimated light is reflected twice by prism 108 and is directed toward a first TFF 110. Similar to FIG. 1, light having wavelength $\lambda 1$ is outputted from CH1 port, light having wavelength $\lambda 2$ is outputted from CH2 port, light having wavelength $\lambda 3$ is outputted from CH3 port, and light having wavelength $\lambda 4$ is outputted from CH4 port.

Similarly, prism 108 in FIG. 3 may be replaced by a pair of mirrors 204 as shown in FIG. 2A, according to an embodiment of the invention, or a pair of prisms 206 as shown in FIG. 2B, according to an embodiment of the invention.

It is appreciated that 4 channel Mux/Demux 300 of FIG. 3 and Mux/Demux 100 of FIG. 1 may be extended to 8 channel or any channel Mux/Demux by adding fibers of FAU 116 and using a corresponding MLA 114.

Figure 4:
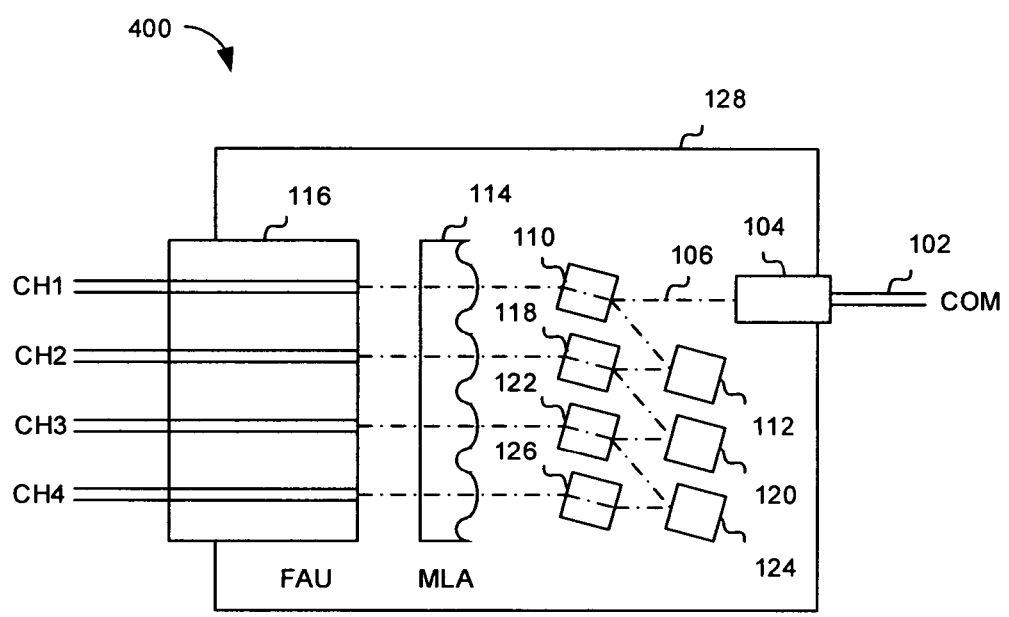
FIG. 4 shows a Mux/Demux comprising a fiber collimator disposed on the opposite side from a FAU.

FIG. 4 shows an ultra compact free-space Mux/Demux 400 similar to Mux/Demux 100 of FIG. 1, according to an embodiment of the invention. For brevity, detailed descriptions of identical portions are omitted. Mux/Demux 400 comprises an input fiber 102 coupled with a fiber collimator 104 forming a common (COM) port. Fiber collimator 104 is disposed on the opposite side from FAU 116. Light 106 exiting from fiber collimator 104 is directed toward a first TFF 110 in free space without using a prism as in Mux/Demux 100 of FIG. 1. Similar to FIG. 1, light having wavelength $\lambda 1$ is outputted from CH1 port, light having wavelength $\lambda 2$ is outputted from CH2 port, light having wavelength $\lambda 3$ is outputted from CH3 port, and light having wavelength $\lambda 4$ is outputted from CH4 port.

Figure 5:
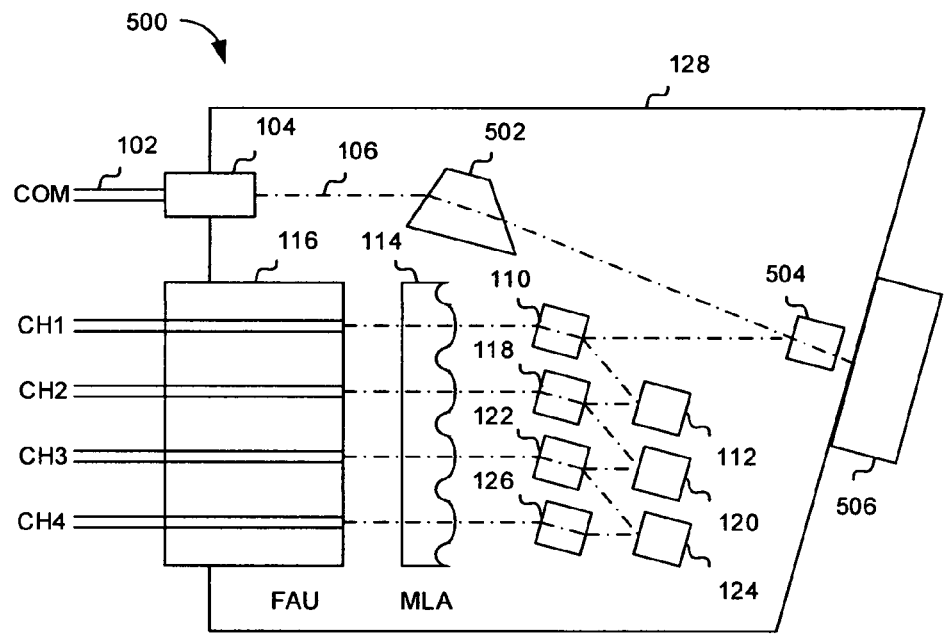
FIG. 5 shows an arrangement on a first surface of a substrate of a Mux/Demux.

A Mux/Demux may be disposed on two surfaces of the substrate. FIG. 5 shows arrangement of an ultra compact free-space Mux/Demux 500 on a first surface of a substrate 128 comprising four channels, according to an embodiment of the invention. When the Mux/Demux 500 operates as a Demux, an input fiber 102 coupled with a fiber collimator 104 forms a common (COM) port. Light 106 exiting from fiber collimator 104 is deflected by a prism 502 and is directed toward an edge pass filter 504 in free space. For example, Mux/Demux 500 has eight channels, four channels on each side of the substrate. Edge pass filter 504 may transmit light having wavelengths λ5-λ8 toward a turning prism 506 and reflect light having wavelengths λ1-λ4.

Light having wavelengths λ1-λ4 reflected by edge pass filter 504 is directed toward a first TFF 110. First TFF 110 transmits light having wavelength λ1 and reflects the remaining light having other wavelengths toward a mirror 112. Light transmitted by first TFF 110 is focused by a first microlens of a first MLA 114 onto a first fiber of a first FAU 116. The first fiber of first FAU 116 forms channel 1 (CH1) port.

Light reflected by first TFF 110 toward mirror 112 is further reflected by mirror 112 toward a second TFF 118. Second TFF 118 transmits light having wavelength λ2 and reflects the remaining light having other wavelengths toward a mirror 120. Light transmitted by second TFF 118 is focused by a second microlens of first MLA 114 onto a second fiber of first FAU 116. The second fiber of first FAU 116 forms channel 2 (CH2) port.

Light reflected by second TFF 118 toward mirror 120 is further reflected by mirror 120 toward a third TFF 122. Third TFF 122 transmits light having wavelength λ3 and reflects the remaining light having wavelength λ4 toward a mirror 124. Light transmitted by third TFF 122 is focused by a third microlens of first MLA 114 onto a third fiber of first FAU 116. The third fiber of first FAU 116 forms channel 3 (CH3) port.

Light reflected by third TFF 122 toward mirror 124 is further reflected by mirror 124 toward an optional fourth TFF 126. Fourth TFF 126 transmits the remaining light having wavelength λ4. Light transmitted by fourth TFF 126 is focused by a fourth microlens of first MLA 114 onto a fourth fiber of first FAU 116. Optionally, there is no fourth TFF 126, light reflected by mirror 124 is focused by a fourth microlens of first MLA 114 onto a fourth fiber of first FAU 116. The fourth fiber of first FAU 116 forms channel 4 (CH4) port.

Figure 6:
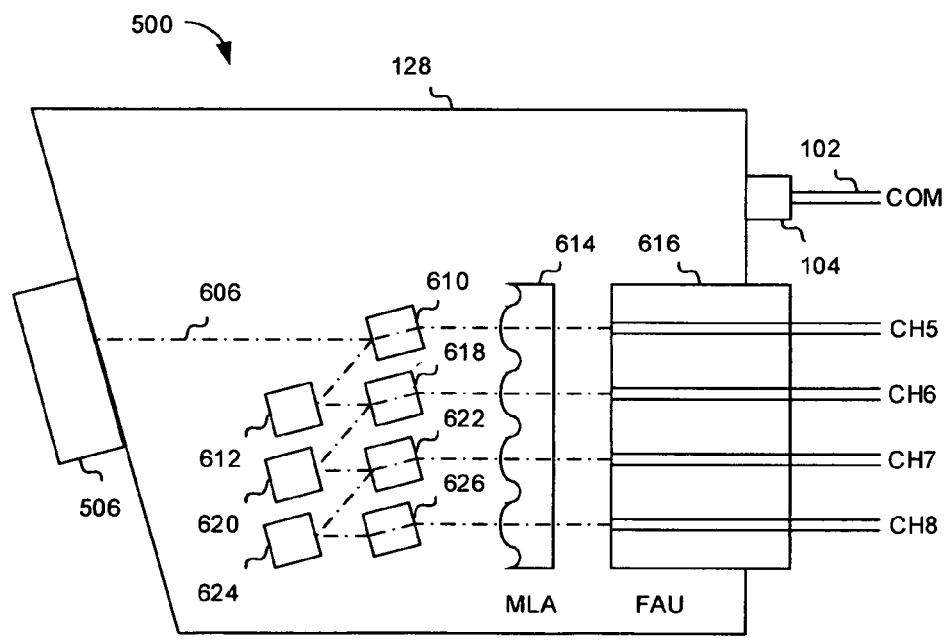
FIG. 6 shows an arrangement on a second surface of the substrate of the Mux/Demux of FIG. 5.

FIG. 6 shows arrangement of ultra compact free-space Mux/Demux 500 on a second surface of substrate 128 comprising four channels, according to an embodiment of the invention. The second surface of substrate 128 is opposite to the first surface of substrate 128. In FIG. 5, edge pass filter 504 transmits light having wavelengths λ5-λ8 toward turning prism 506.

Figure 7A:
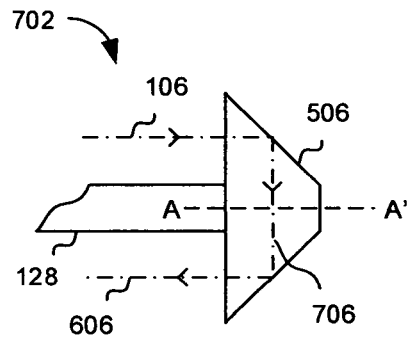
FIG. 7A shows a cross-section perpendicular to a turning prism.
Figure 7B:
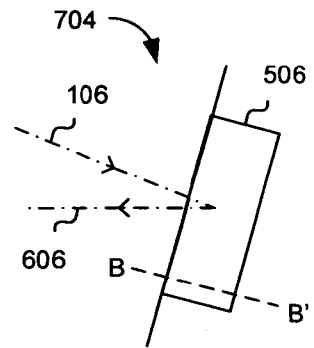
FIG. 7B shows a cross-section parallel to a first surface and a second surface of a substrate.

For better understanding, turning prism 506 is illustrated in FIG. 7A and FIG. 7B, according to an embodiment of the invention. FIG. 7A shows a cross-section 702 of turning prism 506, cross-section 702 is perpendicular to turning prism 506. Light 106 transmitted through edge pass filter 504 having wavelengths λ5-λ8 on the first surface of substrate 128 is reflected 90° by turning prism 506 becoming light 706. Light 706 is once more reflected 90° by turning prism 506 becoming light 606 on the second surface of substrate 128.

FIG. 7B shows a cross-section 704 of turning prism 506, cross-section 704 is parallel to the first surface and the second surface of substrate 128. In FIG. 7B, light 706 is not shown since it is perpendicular to the paper. Light 106 is incident obliquely to turning prism 506 and light 606 is reflected obliquely by turning prism 506. Light 106 and light 606 do not overlap on cross-section 704. Cross-section 702 (FIG. 7A) cuts along line BB' in FIG. 7B, and cross-section 704 (FIG. 7B) cuts along line AA' in FIG. 7A.

Referring back to FIG. 6, light 606 having wavelengths λ5-λ8 is reflected from turning prism 506 toward a fifth TFF 610 in free space. Fifth TFF 610 transmits light having wavelength λ5 and reflects the remaining light having other wavelengths toward a mirror 612. Light transmitted by fifth TFF 610 is focused by a first microlens of a second MLA 614 onto a first fiber of a second FAU 616. The first fiber of second FAU 616 forms channel 5 (CH5) port.

Light reflected by fifth TFF 610 toward mirror 612 is further reflected by mirror 612 toward a sixth TFF 618. Sixth TFF 618 transmits light having wavelength λ6 and reflects the remaining light having other wavelengths toward a mirror 620. Light transmitted by sixth TFF 618 is focused by a second microlens of second MLA 614 onto a second fiber of second FAU 616. The second fiber of second FAU 616 forms channel 6 (CH6) port.

Light reflected by sixth TFF 618 toward mirror 620 is further reflected by mirror 620 toward a seventh TFF 622. Seventh TFF 622 transmits light having wavelength λ7 and reflects the remaining light having wavelength λ8 toward a mirror 624. Light transmitted by seventh TFF 622 is focused by a third microlens of second MLA 614 onto a third fiber of second FAU 616. The third fiber of second FAU 616 forms channel 7 (CH7) port.

Light reflected by seventh TFF 622 toward mirror 624 is further reflected by mirror 624 toward an optional eighth TFF 626. Eighth TFF 626 transmits the remaining light having wavelength λ8. Light transmitted by eighth TFF 626 is focused by a fourth microlens of second MLA 614 onto a fourth fiber of second FAU 616. Optionally, there is no eighth TFF 626, light reflected by mirror 624 is focused by a fourth microlens of second MLA 614 onto a fourth fiber of second FAU 616. The fourth fiber of second FAU 616 forms channel 8 (CH8) port.

Figure 8:
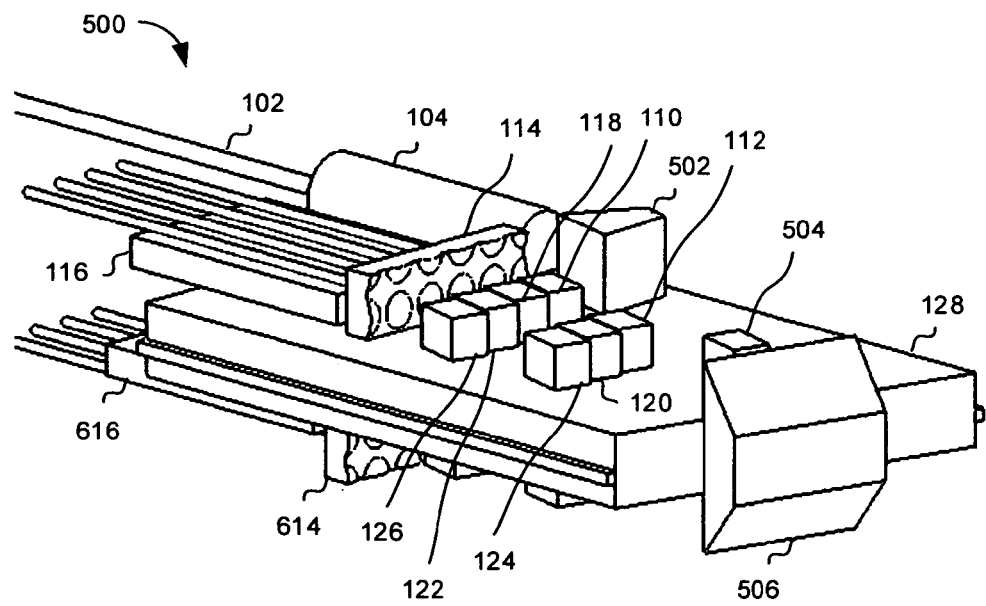
FIG. 8 shows a perspective view of the Mux/Demux of FIG. 5 and FIG. 6.

FIG. 8 shows a perspective view of ultra compact free-space Mux/Demux 500 of FIG. 5 and FIG. 6, according to an embodiment of the invention. Accordingly, elements shown in FIG. 8 are the same as elements shown in FIG. 5 and FIG. 6. FIG. 8 especially shows the 3D position of turning prism 506 relative to substrate 128.

Figure 9:
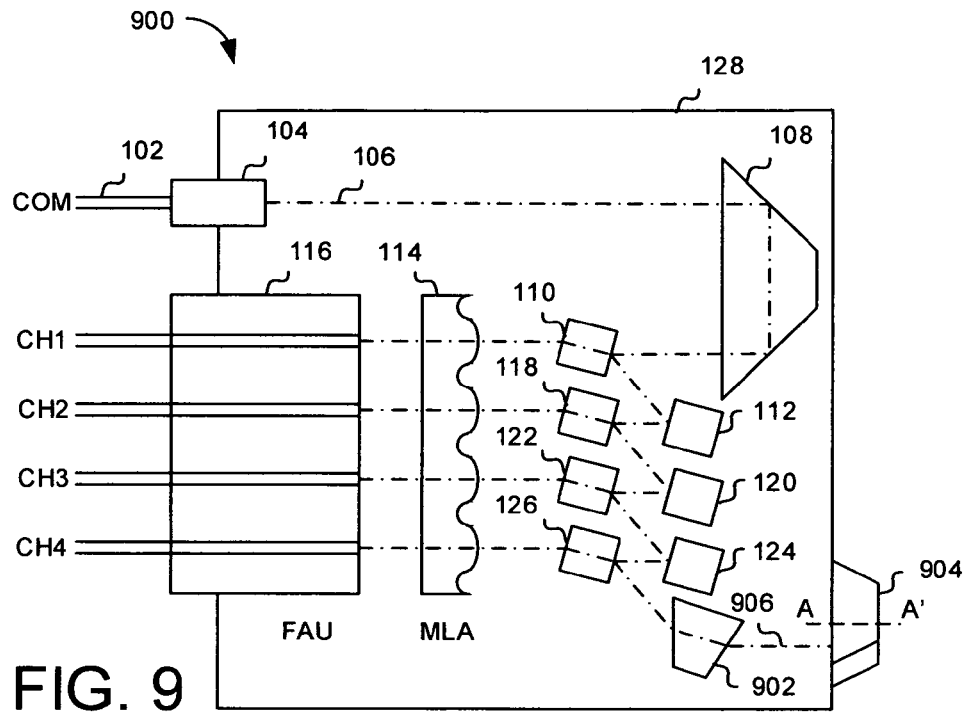
FIG. 9 shows an arrangement on a first surface of a substrate of a Mux/Demux.

FIG. 9 shows arrangement of an ultra compact free-space Mux/Demux 900 on a first surface of a substrate 128 comprising four channels, according to an embodiment of the invention. For example, Mux/Demux 900 has eight channels, four channels on each side. When the Mux/Demux 900 operates as a Demux, an input fiber 102 coupled with a fiber collimator 104 forms a common (COM) port.

Light 106 exiting from fiber collimator 104 having wavelengths λ1-λ8 is reflected by a first prism 108 and is directed toward a first TFF 110 in free space. First TFF 110 transmits light having wavelength λ1 and reflects the remaining light having other wavelengths toward a mirror 112. Light transmitted by first TFF 110 is focused by a first microlens of a first MLA 114 onto a first fiber of a first FAU 116. The first fiber of first FAU 116 forms channel 1 (CH1) port.

Light reflected by first TFF 110 toward mirror 112 is further reflected by mirror 112 toward a second TFF 118. Second TFF 118 transmits light having wavelength λ2 and reflects the remaining light having other wavelengths toward a mirror 120. Light transmitted by second TFF 118 is focused by a second microlens of first MLA 114 onto a second fiber of first FAU 116. The second fiber of first FAU 116 forms channel 2 (CH2) port.

Light reflected by second TFF 118 toward mirror 120 is further reflected by mirror 120 toward a third TFF 122. Third TFF 122 transmits light having wavelength λ3 and reflects the remaining light having other wavelengths toward a mirror 124. Light transmitted by third TFF 122 is focused by a third microlens of first MLA 114 onto a third fiber of first FAU 116. The third fiber of first FAU 116 forms channel 3 (CH3) port.

Light reflected by third TFF 122 toward mirror 124 is further reflected by mirror 124 toward a fourth TFF 126. Fourth TFF 126 transmits light having wavelength λ4 and reflects the remaining light having other wavelengths toward a second prism 902. Light transmitted by fourth TFF 126 is focused by a fourth microlens of first MLA 114 onto a fourth fiber of first FAU 116. The fourth fiber of first FAU 116 forms channel 4 (CH4) port.

Light reflected by fourth TFF 126 toward second prism 902 is further deflected by second prism 902 toward a turning prism 904. Light 906 deflected by second prism 902 has wavelengths λ5-λ8. Light 906 having wavelengths λ5-λ8 on the first surface of substrate 128 coming from second prism 902 is reflected 90° twice by turning prism 904 becoming light 1002 on a second surface of substrate 128 (see FIG. 10).

Figure 10:
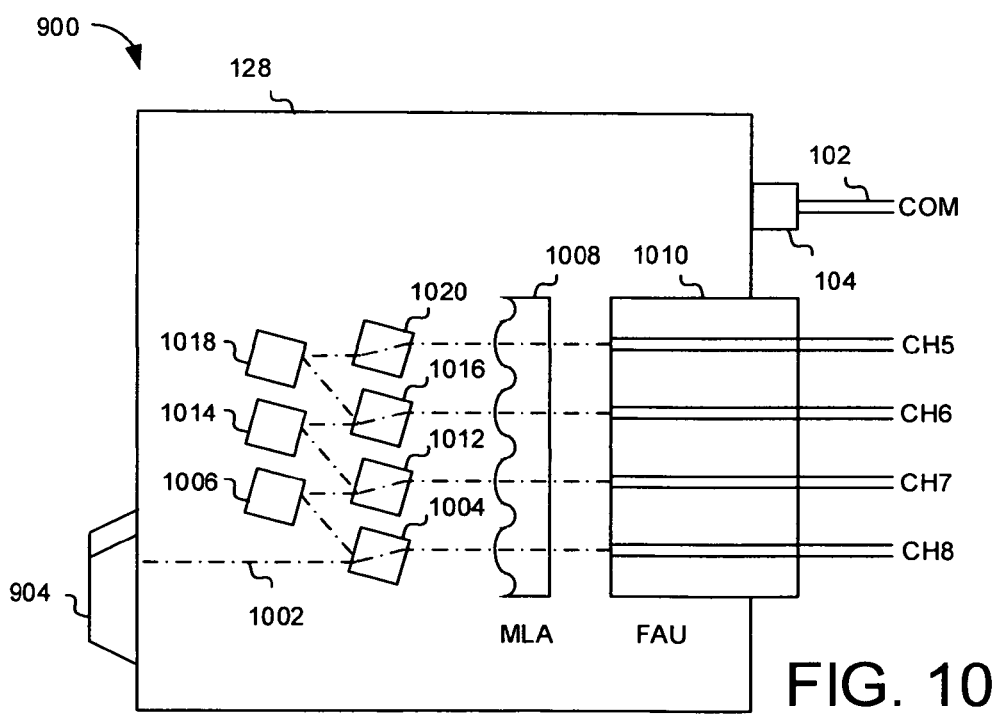
FIG. 10 shows an arrangement on a second surface of the substrate of the Mux/Demux of FIG. 9.

FIG. 10 shows arrangement of ultra compact free-space Mux/Demux 900 on the second surface of substrate 128 comprising four channels, according to an embodiment of the invention. The second surface of substrate 128 is opposite to the first surface of substrate 128 shown in FIG. 9.

Light 1002 having wavelengths λ5-λ8 is coming from turning prism 904 toward a fifth TFF 1002 in free space. Fifth TFF 1004 transmits light having wavelength λ8 and reflects the remaining light having other wavelengths toward a mirror 1006. Light transmitted by fifth TFF 1004 is focused by a first microlens of a second MLA 1008 onto a first fiber of a second FAU 1010. The first fiber of second FAU 1010 forms channel 8 (CH8) port. Note that the first microlens of second MLA 1008 is positioned closest to fifth TFF 1004, and the first fiber of second FAU 1010 is positioned next to the first microlens of second MLA 1008.

Light reflected by fifth TFF 1004 toward mirror 1006 is further reflected by mirror 1006 toward a sixth TFF 1012. Sixth TFF 1012 transmits light having wavelength λ7 and reflects the remaining light having other wavelengths toward a mirror 1014. Light transmitted by sixth TFF 1012 is focused by a second microlens of second MLA 1008 onto a second fiber of second FAU 1010. The second fiber of second FAU 1010 forms channel 7 (CH7) port.

Light reflected by sixth TFF 1012 toward mirror 1014 is further reflected by mirror 1014 toward a seventh TFF 1016. Seventh TFF 1016 transmits light having wavelength λ6 and reflects the remaining light having wavelength λ5 toward a mirror 1018. Light transmitted by seventh TFF 1016 is focused by a third microlens of second MLA 1008 onto a third fiber of second FAU 1010. The third fiber of second FAU 1010 forms channel 6 (CH6) port.

Light reflected by seventh TFF 1016 toward mirror 1018 is further reflected by mirror 1018 toward an optional eighth TFF 1020. Eighth TFF 1020 transmits the remaining light having wavelength λ5. Light transmitted by eighth TFF 1020 is focused by a fourth microlens of second MLA 1008 onto a fourth fiber of second FAU 1010. Optionally, there is no eighth TFF 1020, light reflected by mirror 1018 is focused by a fourth microlens of second MLA 1008 onto a fourth fiber of second FAU 1010. The fourth fiber of second FAU 1008 forms channel 5 (CH5) port.

Figure 11:
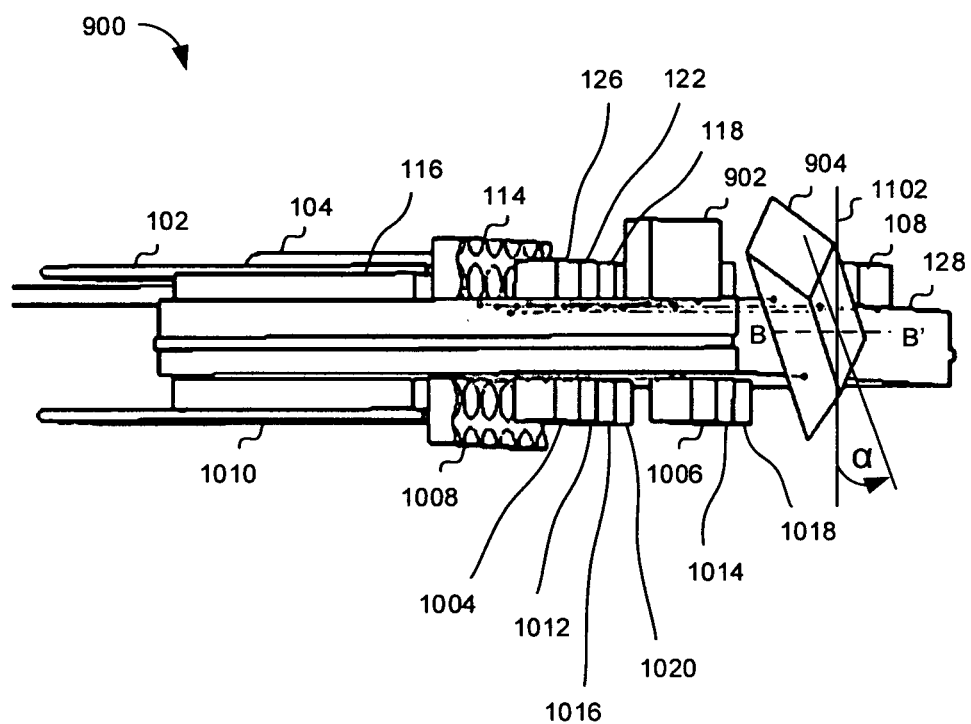
FIG. 11 shows a perspective view of the Mux/Demux of FIG. 9 and FIG. 10.

FIG. 11 shows a perspective view of ultra compact free-space Mux/Demux 900 of FIG. 9 and FIG. 10, according to an embodiment of the invention. Accordingly, elements shown in FIG. 11 are the same as elements shown in FIG. 9 and FIG. 10. FIG. 11 especially shows the 3D position of turning prism 904 relative to substrate 128. Turning prism 904 is rotated by a from a vertical axis 1102 perpendicular to substrate 128.

For better understanding, turning prism 904 is illustrated in FIGS. 12A through 12D, according to an embodiment of the invention. FIG. 12A shows a cross-section 1202 of turning prism 904 for α=0. Cross-section 1202 is perpendicular to the first surface and the second surface of substrate 128 along line AA' in FIG. 9. Light 906 coming from second prism 902 having wavelengths λ5-λ8 on the first surface of substrate 128 is reflected 90° by turning prism 904 becoming light 1206. Light 1206 is once more reflected 90° by turning prism 904 becoming light 1002 on the second surface of substrate 128. FIG. 12B shows a cross-section 1204 of turning prism 904 for α=0. Cross-section 1204 is parallel to the first surface and the second surface of substrate 128 along line BB' in FIG. 11. In FIG. 12B, light 1206 is not shown since it is perpendicular to the paper.

FIG. 12C shows a cross-section 1202 of turning prism 904 for α≠0. Cross-section 1202 is perpendicular to the first surface and the second surface of substrate 128 along line AA' in FIG. 9. Comparing to FIG. 12A, light 1002 is closer to the second surface of substrate 128 because turning prism 904 is oriented at α≠0. FIG. 12D shows a cross-section 1204 of turning prism 904 for α≠0. Cross-section 1204 is parallel to the first surface and the second surface of substrate 128 along line BB' in FIG. 11. Comparing to FIG. 12B, light 1002 is shifted by a distance d 1208 from light 906 because turning prism 904 is oriented at α≠0.

Figure 13:
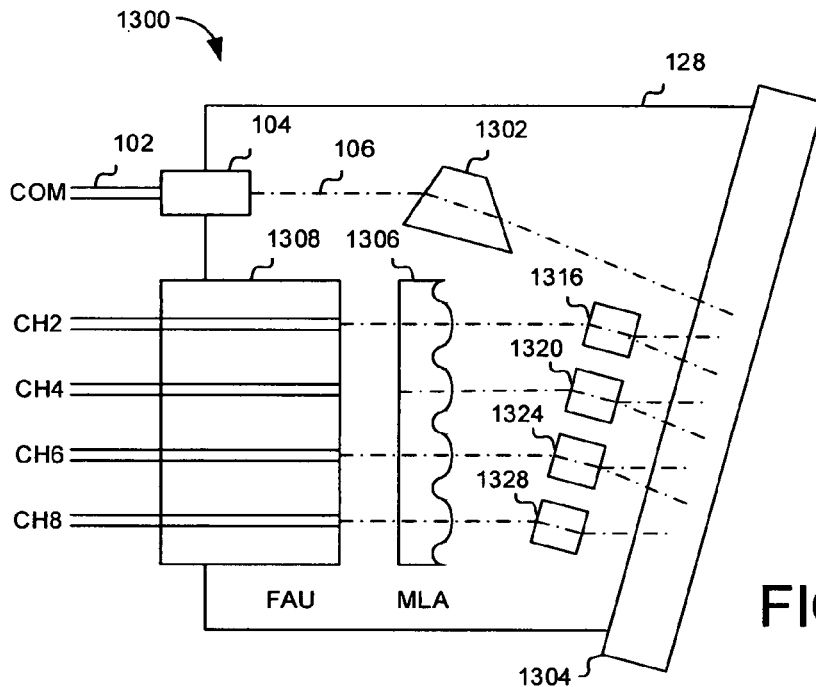
FIG. 13 shows an arrangement on a first surface of a substrate of a Mux/Demux.
Figure 14:
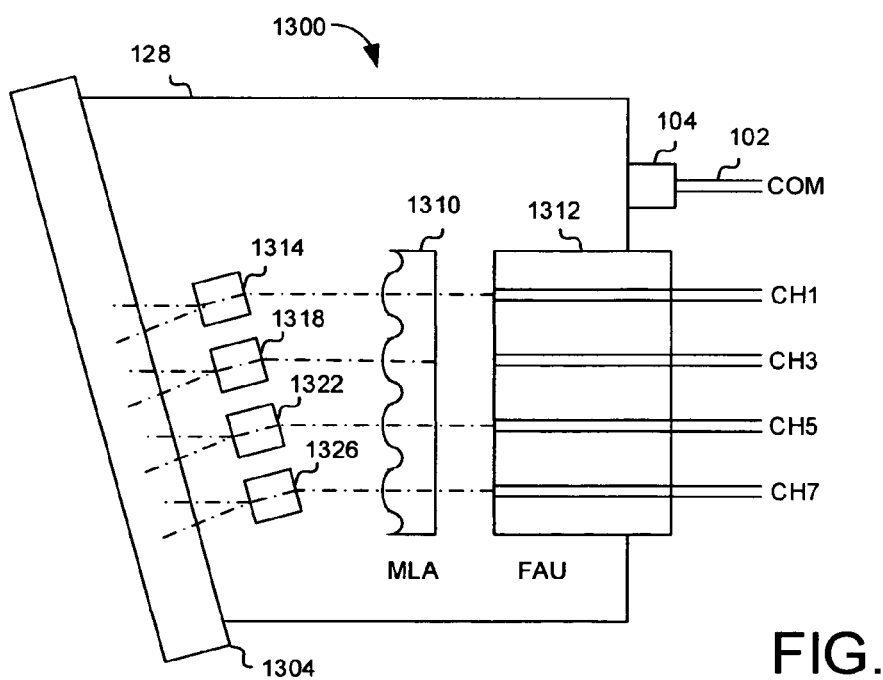
FIG. 14 an arrangement on a second surface of the substrate of the Mux/Demux of FIG. 13.

FIG. 13 shows arrangement of an ultra compact free-space Mux/Demux 1300 on a first surface of a substrate 128 comprising four channels, according to an embodiment of the invention. For example, Mux/Demux 1300 has eight channels, four channels on each side. When the Mux/Demux 1300 operates as a Demux, an input fiber 102 coupled with a fiber collimator 104 forms a common (COM) port. FIG. 14 shows arrangement of ultra compact free-space Mux/Demux 1300 on a second surface of substrate 128 comprising four channels, according to an embodiment of the invention. The second surface of substrate 128 is opposite to the first surface of substrate 128.

Mux/Demux 1300 comprises a prism 1302 disposed on the first surface of substrate 128, and a turning prism 1304 at a slating edge of substrate 128 for turning light from the first surface of substrate 128 to the second surface of substrate 128, and from the second surface of substrate 128 to the first surface of substrate 128. Prism 1302 deflects light 106 from fiber collimator 104 toward turning prism 1304 in free space.

The following description refers to both FIG. 13 and FIG. 14. Ultra compact free-space Mux/Demux 1300 comprises a first MLA 1306 and a first FAU 1308 on the first surface of substrate 128, and a second MLA 1310 and a second FAU 1312 on the second surface of substrate 128.

Light 106 exiting from fiber collimator 104 having wavelengths λ1-λ8 is deflected by prism 1302 and is directed toward turning prism 1304 in free space. Turning prism 1304 reflects light from prism 1302, turning it from the first surface of substrate 128 to the second surface of substrate 128, and directs it toward a first TFF 1314 on the second surface of substrate 128 in free space. First TFF 1314 transmits light having wavelength λ1 and reflects the remaining light having other wavelengths toward turning prism 1304. Light transmitted by first TFF 1314 is focused by a first microlens of second MLA 1310 onto a first fiber of second FAU 1312. The first fiber of second FAU 1312 forms channel 1 (CH1) port on the second surface of substrate 128.

Light reflected by first TFF 1314 toward turning prism 1304 is turned from the second surface of substrate 128 to the first surface of substrate 128 and reflected by turning prism 1304 toward a second TFF 1316 on the first surface of substrate 128. Second TFF 1316 transmits light having wavelength λ2 and reflects the remaining light having other wavelengths toward turning prism 1304. Light transmitted by second TFF 1316 is focused by a first microlens of first MLA 1306 onto a first fiber of first FAU 1308. The first fiber of first FAU 1308 forms channel 2 (CH2) port on the first surface of substrate 128.

Light reflected by second TFF 1316 toward turning prism 1204 is turned from the first surface of substrate 128 to the second surface of substrate 128 and reflected by turning prism 1304 toward a third TFF 1318 on the second surface of substrate 128. Third TFF 1318 transmits light having wavelength λ3 and reflects the remaining light having other wavelengths toward turning prism 1304. Light transmitted by third TFF 1318 is focused by a second microlens of second MLA 1310 onto a second fiber of second FAU 1312. The second fiber of second FAU 1312 forms channel 3 (CH3) port on the second surface of substrate 128.

Light reflected by third TFF 1318 toward turning prism 1304 is turned from the second surface of substrate 128 to the first surface of substrate 128 and reflected by turning prism 1304 toward a fourth TFF 1320 on the first surface of substrate 128. Fourth TFF 1320 transmits light having wavelength λ4 and reflects the remaining light having other wavelengths toward turning prism 1304. Light transmitted by fourth TFF 1320 is focused by a second microlens of first MLA 1306 onto a second fiber of first FAU 1308. The second fiber of first FAU 1308 forms channel 4 (CH4) port on the first surface of substrate 128.

Light reflected by fourth TFF 1320 toward turning prism 1204 is turned from the first surface of substrate 128 to the second surface of substrate 128 and reflected by turning prism 1204 toward a fifth TFF 1322 on the second surface of substrate 128. Fifth TFF 1322 transmits light having wavelength λ5 and reflects the remaining light having other wavelengths toward turning prism 1304. Light transmitted by fifth TFF 1322 is focused by a third microlens of second MLA 1310 onto a third fiber of second FAU 1312. The third fiber of second FAU 1312 forms channel 5 (CH5) port on the second surface of substrate 128.

Light reflected by fifth TFF 1322 toward turning prism 1304 is turned from the second surface of substrate 128 to the first surface of substrate 128 and reflected by turning prism 1304 toward a sixth TFF 1324 on the first surface of substrate 128. Sixth TFF 1324 transmits light having wavelength λ6 and reflects the remaining light having other wavelengths toward turning prism 1304. Light transmitted by sixth TFF 1324 is focused by a third microlens of first MLA 1306 onto a third fiber of first FAU 1308. The third fiber of first FAU 1308 forms channel 6 (CH6) port on the first surface of substrate 128.

Light reflected by sixth TFF 1324 toward turning prism 1304 is turned from the first surface of substrate 128 to the second surface of substrate 128 and reflected by turning prism 1304 toward a seventh TFF 1326 on the second surface of substrate 128. Seventh TFF 1326 transmits light having wavelength λ7 and reflects the remaining light having wavelength λ8 toward turning prism 1304. Light transmitted by seventh TFF 1326 is focused by a fourth microlens of second MLA 1310 onto a fourth fiber of second FAU 1312. The fourth fiber of second FAU 1312 forms channel 7 (CH7) port on the second surface of substrate 128.

Light reflected by seventh TFF 1326 toward turning prism 1304 is turned from the second surface of substrate 128 to the first surface of substrate 128 and reflected by turning prism 1304 toward an optional eighth TFF 1328 on the first surface of substrate 128. Eighth TFF 1328 transmits the remaining light having wavelength λ8. Light transmitted by eighth TFF 1328 is focused by a fourth microlens of first MLA 1306 onto a fourth fiber of first FAU 1308. Optionally, there is no eighth TFF 1328, light reflected by turning prism 1304 is focused by a fourth microlens of first MLA 1306 onto a fourth fiber of first FAU 1308. The fourth fiber of first FAU 1308 forms channel 8 (CH8) port on the first surface of substrate 128.

Figure 15A:
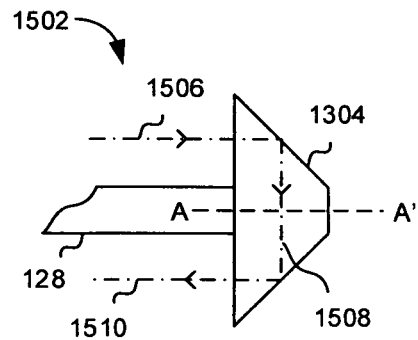
FIG. 15A shows a cross-section perpendicular to a turning prism.
Figure 15B:
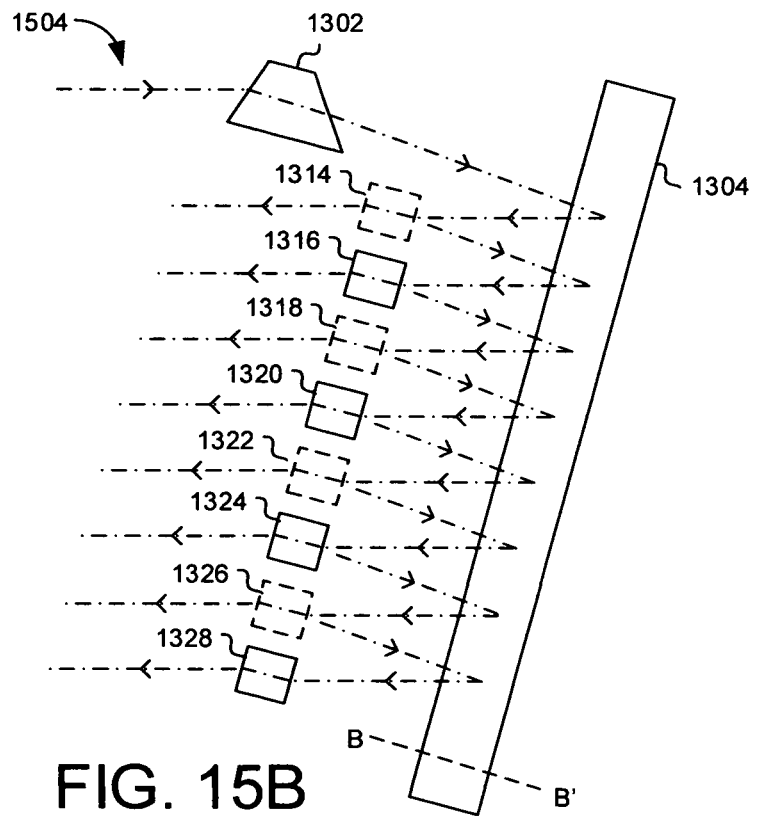
FIG. 15B shows a cross-section parallel to a first surface and a second surface of a substrate.

For better understanding, turning prism 1304 is illustrated in FIG. 15A and FIG. 15B, according to an embodiment of the invention. FIG. 15A shows a cross-section 1502 of turning prism 506, cross-section 702 is perpendicular to turning prism 1304. Light 1506 on the first surface of substrate 128 is reflected 90° by turning prism 1304 becoming light 1508. Light 1508 is once more reflected 90° by turning prism 1304 becoming light 1510 on the second surface of substrate 128.

FIG. 15B shows a cross-section 1504 of turning prism 1304, cross-section 1504 is parallel to the first surface and the second surface of substrate 128. The incident light and the reflected light form oblique angles with turning prism 1302. Cross-section 1502 (FIG. 15A) cuts along line BB' in FIG. 15B, and cross-section 1504 (FIG. 15B) cuts along line AA' in FIG. 15A.

FIG. 15B shows schematically light paths: (1) from prism 1302 on the first surface of substrate 128 to first TFF 1314 on the second surface of substrate 128, (2) from first TFF 1314 on the second surface of substrate 128 to second TFF 1316 on the first surface of substrate 128, (3) from second TFF 1316 on the first surface of substrate 128 to third TFF 1318 on the second surface of substrate 128, (4) from third TFF 1318 on the second surface of substrate 128 to fourth TFF 1320 on the first surface of substrate 128, (5) from fourth TFF 1320 on the first surface of substrate 128 to fifth TFF 1322 on the second surface of substrate 128, (6) from fifth TFF 1322 on the second surface of substrate 128 to sixth TFF 1324 on the first surface of substrate 128, (7) from sixth TFF 1324 on the first surface of substrate 128 to seventh TFF 1326 on the second surface of substrate 128, and (8) from seventh TFF 1326 on the second surface of substrate 128 to eighth TFF 1328 on the first surface of substrate 128. Elements on the first surface of substrate are illustrated in solid lines, elements on the second surface of substrate 128 are illustrated in broken lines.

All light paths on the first surface of substrate 128 in FIG. 15B correspond to light 1506 in FIG. 15A. All light paths on the second surface of substrate 128 in FIG. 15B correspond to light 1510 in FIG. 15B. Light 1508 is not shown in FIG. 15B since it is perpendicular to the paper.

Figure 16:
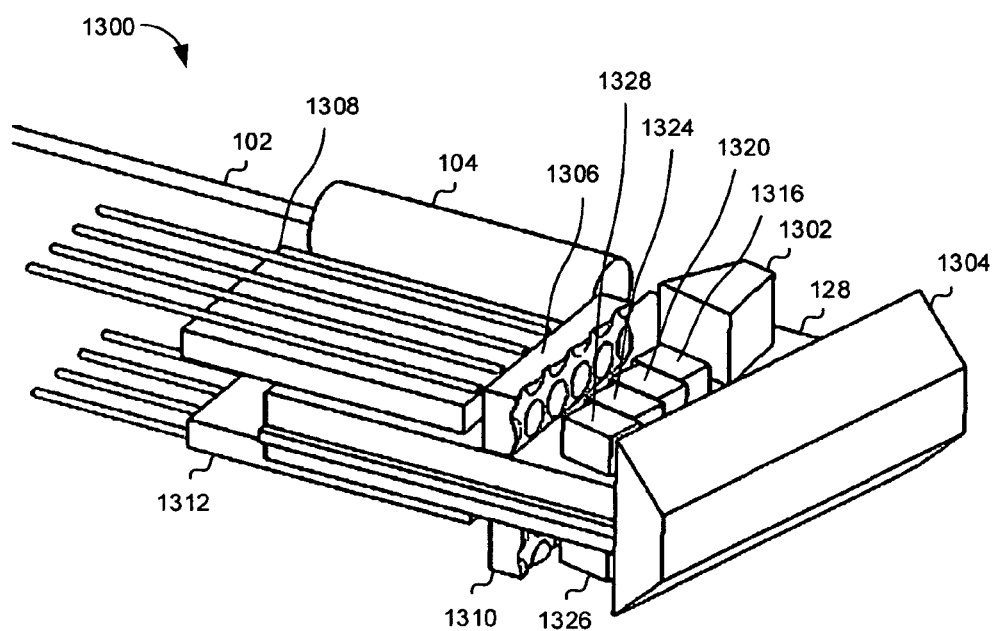
FIG. 16 shows a perspective view of the Mux/Demux of FIG. 13 and FIG. 14.

FIG. 16 shows a perspective view of ultra compact free-space Mux/Demux 1300 of FIG. 13 and FIG. 14, according to an embodiment of the invention. Accordingly, elements shown in FIG. 16 are the same as elements shown in FIG. 12 and FIG. 13. FIG. 16 especially shows the 3D position of turning prism 1304 relative to substrate 128.

It is appreciated that ultra compact free-space Mux/Demux having eight channel ports is for example only. An ultra compact free-space Mux/Demux may have less or more than eight channel ports. One side of the Mux/Demux may have less or more than four channel ports. Mirrors 112, 120, and 124 of FIG. 5 may be replaced by a single mirror because the tilt angles of mirrors 112, 120 and 124 are the same. Similarly, mirrors 612, 620, and 624 of FIG. 6, mirrors 112, 120, and 124 of FIG. 9, mirrors 1004, 1012, and 1016 of FIG. 10, may be replaced by respective single mirrors.

While the present invention has been described herein with respect to the exemplary embodiments and the best mode for practicing the invention, it will be apparent to one of ordinary skill in the art that many modifications, improvements and sub-combinations of the various embodiments, adaptations and variations can be made to the invention without departing from the spirit and scope thereof.

The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An apparatus for multiplexing and demultiplexing comprising:
   a substrate having a first surface and a second surface, wherein the second surface is opposite to the first surface;
   a first fiber array unit disposed on the first surface of the substrate, wherein a plurality of fibers in the first fiber array unit are arranged in an array on a chip;
   a first micro lens array disposed on the first surface of the substrate;
   a plurality of thin film filters disposed on the first surface of the substrate, wherein each thin film filter transmits light having a different wavelength band;
   wherein light transmitted by a thin film filter is focused by a microlens of the first micro lens array onto a first fiber of the first fiber array unit;
   wherein the first fiber of the first fiber array unit forms a channel port; and
   a plurality of mirrors, wherein each mirror reflects light coming from a first thin film filter toward a second thin film filter.

2. The apparatus of claim 1, further comprising: a fiber collimator disposed on the first surface of the substrate forming a common port.

3. An apparatus for multiplexing and demultiplexing comprising:
   a substrate having a first surface and a second surface, wherein the second surface is opposite to the first surface;
   a first fiber array unit disposed on the first surface of the substrate, wherein a plurality of fibers in the first fiber array unit are arranged in an array on a chip;
   a first micro lens array disposed on the first surface of the substrate;
   a plurality of thin film filters disposed on the first surface of the substrate, wherein each thin film filter transmits light having a different wavelength band;
   wherein light transmitted by a thin film filter is focused by a microlens of the first micro lens array onto a first fiber of the first fiber array unit;
   wherein the first fiber of the first fiber array unit forms a channel port; and
   a turning prism disposed at an edge of the substrate for turning light from the first surface of the substrate to the second surface of the substrate.

4. The apparatus of claim 3, further comprising:
   the turning prism being disposed at a slanting edge of the substrate for turning light from the second surface of the substrate to the first surface of the substrate.

5. An apparatus for multiplexing and demultiplexing comprising:
   a substrate having a first surface and a second surface, wherein the second surface is opposite to the first surface;
   a first fiber array unit disposed on the first surface of the substrate, wherein a plurality of fibers in the first fiber array unit are arranged in an array on a chip;
   a first micro lens array disposed on the first surface of the substrate;
   a plurality of thin film filters disposed on the first surface of the substrate, wherein each thin film filter transmits light having a different wavelength band;
   wherein light transmitted by a thin film filter is focused by a microlens of the first micro lens array onto a first fiber of the first fiber array unit;
   wherein the first fiber of the first fiber array unit forms a channel port;
   a second fiber array unit disposed on the second surface of the substrate, wherein a plurality of fibers in the second fiber array unit are arranged in an array on a chip;
   a second microlens array disposed on the second surface of the substrate;
   a plurality of thin film filters disposed on the second surface of the substrate, wherein each thin film filter transmits light having a different wavelength band;
   a turning prism disposed at an edge of the substrate for turning light from the first surface of the substrate to the second surface of the substrate;
   wherein light transmitted by a thin film filter is focused by a microlens of the second micro lens array onto a first fiber of the second fiber array unit; and
   wherein the first fiber of the second fiber array unit forms a channel port.

6. The apparatus of claim 2, further comprising:
   a prism for reflecting light coming from the fiber collimator toward a thin film filter.

7. The apparatus of claim 2, further comprising:
   a turning prism disposed at an edge of the substrate for turning light from the first surface of the substrate to the second surface of the substrate;
   an edge pass filter for reflecting light having a first plurality of multiple wavelengths and transmitting a second plurality of multiple wavelengths;
   a prism for deflecting light coming from the fiber collimator toward the edge pass filter;
   wherein the edge pass filter reflects light having the first plurality of multiple wavelengths toward a thin film filter and transmits light having the second plurality of multiple wavelengths toward the turning prism.

8. The apparatus of claim 2, further comprising:
   a turning prism disposed at an edge of the substrate for turning light from the first surface of the substrate to the second surface of the substrate;
   a first prism for reflecting light coming from the fiber collimator toward a first thin film filter on the first surface of the substrate; and
   a second prism for deflecting light coming from a last thin film filter on the first surface of the substrate toward the turning prism.

9. The apparatus of claim 2, further comprising:
   a turning prism disposed at a slanting edge of the substrate for turning light from the first surface of the substrate to the second surface of the substrate and turning light from the second surface of the substrate to the first surface of the substrate; and
   a prism for deflecting light coming from the fiber collimator toward the turning prism.

10. The apparatus of claim 1, wherein the plurality of fibers are disposed in V-grooves on the chip.

11. The apparatus of claim 10, wherein a pitch of the V-grooves is one of 127 µm and 250 µm.

12. The apparatus of claim 10, wherein the chip is made from one of glass, quartz, silicon, pyrex, and polymeric materials.

13. The apparatus of claim 11, wherein a pitch of the microlens array is 250 µm.

14. A method for multiplexing and demultiplexing comprising:
   providing a substrate having a first surface and a second surface, the second surface is opposite to the first surface;
   providing a plurality of thin film filters disposed on the first surface of the substrate, wherein each thin film filter transmits light having a different wavelength band;
   providing a first fiber array unit disposed on the first surface of the substrate, wherein a plurality of fibers in the first fiber array unit are arranged in an array on a chip;
   providing a first micro lens array disposed on the first surface of the substrate;
   a turning prism disposed at an edge of the substrate, a function of the turning prism includes turning light from the first surface of the substrate to the second surface of the substrate;
   providing a plurality of thin film filters disposed on the second surface of the substrate, wherein each thin film filter transmits light having a different wavelength band;
   providing a second fiber array unit disposed on the second surface of the substrate; and
   providing a second micro lens array disposed on the second surface of the substrate.

15. The method of claim 14, wherein the plurality of fibers are disposed in V-grooves on the chip.

16. The method of claim 15, wherein a pitch of the V-grooves is one of 127 µm and 250 µm.

17. The method of claim 14, wherein a pitch of one of the microlens arrays is 250 µm.

\* \* \* \* \*